US010812300B2

(12) United States Patent
Kuchi

(10) Patent No.: US 10,812,300 B2
(45) Date of Patent: Oct. 20, 2020

(54) METHOD AND TRANSMITTER FOR GENERATING A WAVEFORM WITH OPTIMIZED PAPR

(71) Applicant: INDIAN INSTITUTE OF TECHNOLOGY HYDERABAD, Telangana (IN)

(72) Inventor: Kiran Kumar Kuchi, Telangana (IN)

(73) Assignee: INDIAN INSTITUTE OF TECHNOLOGY HYDERABAD, Telangana (IN)

( * ) Notice: Subject to any disclaimer, the term of this patent is extended or adjusted under 35 U.S.C. 154(b) by 0 days.

(21) Appl. No.: 16/060,306

(22) PCT Filed: May 25, 2016

(86) PCT No.: PCT/IB2016/053044
§ 371 (c)(1),
(2) Date: Jun. 7, 2018

(87) PCT Pub. No.: WO2017/178871
PCT Pub. Date: Oct. 19, 2017

(65) Prior Publication Data
US 2019/0052486 A1     Feb. 14, 2019

(30) Foreign Application Priority Data
Apr. 15, 2016   (IN) .............................. 201641013222

(51) Int. Cl.
*H04L 25/03*     (2006.01)
*H04L 27/34*     (2006.01)
*H04L 27/26*     (2006.01)
*H04L 5/00*      (2006.01)

(52) U.S. Cl.
CPC .... *H04L 25/03834* (2013.01); *H04L 27/2607* (2013.01); *H04L 27/2614* (2013.01);
(Continued)

(58) Field of Classification Search
CPC .......... H04L 25/03834; H04L 27/2636; H04L 27/3444; H04L 27/2628; H04L 27/2607;
(Continued)

(56) References Cited
U.S. PATENT DOCUMENTS 5,930,299 A * 7/1999 Vannatta ............. H04L 27/2071
                                                     332/103
2005/0220219 A1* 10/2005 Jensen ................ H04L 27/2017
                                                     375/302
(Continued)

FOREIGN PATENT DOCUMENTS

WO     2008093210 A2    8/2008
WO     2014172343 A1   10/2014

OTHER PUBLICATIONS

International Search Report dated Aug. 8, 2016 for PCT application No. PCT/IB2016/053044.

*Primary Examiner* — Andrew Lai
*Assistant Examiner* — Harry H Kim
(74) *Attorney, Agent, or Firm* — Ohlandt, Greeley, Ruggiero and Perle, LLP

(57) ABSTRACT

Embodiments of the present disclosure disclose method and transmitter to generate and transmit a waveform with an optimized peak to average power (PAPR) in a communication network. The method comprises performing a constellation rotation on input data symbols to create a rotated data symbols, wherein the input data symbols is obtained by performing at least one of prefixing a modulation data with first predefined number (N1) of zero's and post-fixing the modulation data with second predefined number (N2) of zero's. Also, the method comprises performing convolution operation on the input data symbols using one or more filter coefficients to produce a symbol level filtered data. Further, the method comprises pulse shaping the symbol level fil-
(Continued)

tered data to generate a pulse shaped data sequence and processing the pulse shaped data sequence to generate a waveform.

38 Claims, 5 Drawing Sheets

(52) U.S. Cl.
CPC ...... *H04L 27/2628* (2013.01); *H04L 27/2636* (2013.01); *H04L 27/2644* (2013.01); *H04L 27/3444* (2013.01); *H04L 5/0007* (2013.01)

(58) Field of Classification Search
CPC ............. H04L 27/2644; H04L 27/2614; H04L 5/0007
See application file for complete search history.

(56) References Cited

U.S. PATENT DOCUMENTS

| | | | |
|---|---|---|---|
| 2008/0240287 A1* | 10/2008 | Yotsumoto | H04L 27/2624 375/296 |
| 2011/0119567 A1* | 5/2011 | Tu | H04L 1/0059 714/786 |
| 2014/0307761 A1* | 10/2014 | Geile | H04L 5/0005 375/222 |
| 2016/0105860 A1* | 4/2016 | Li | H04W 36/00 370/350 |
| 2016/0254889 A1* | 9/2016 | Shattil | H04L 12/2854 370/329 |
| 2017/0041175 A1* | 2/2017 | Dyson | H04L 25/03057 |
| 2017/0272291 A1* | 9/2017 | Naim | H04L 5/0044 |
| 2018/0109410 A1* | 4/2018 | Kim | H04L 7/041 |

* cited by examiner

US 10,812,300 B2

METHOD AND TRANSMITTER FOR GENERATING A WAVEFORM WITH OPTIMIZED PAPR

TECHNICAL FIELD

Embodiments of the present disclosure are related, in general to communication, but exclusively relate to a method and transmitter for generating a waveform with low peak to average power (PAPR).

BACKGROUND

Orthogonal Frequency Division Multiplexing (OFDM) is widely used in many wireless systems for both modulation and multiple access. The OFDM waveform has high peak-to-average-power-ratio (PAPR) and therefore requires a high power amplifier (PA) back-off during transmission. It is inherently power inefficient modulation. Discrete Fourier Transform precoded OFDM (DFT precoded OFDM) was suggested in the uplink of LTE (Long-Term-Evolution) standards to reduce the PAPR. While OFDM exhibits close to 9 dB PAPR DFT precoded OFDM has PAPR in the range of 5.0-6.0 dB for QPSK (Quadrature-Phase-Shift-Keying) modulation.

Hence, there is a need of a solution for a method and system to generate a precoded waveform with low PAPR.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In an aspect of the present disclosure, a method of generating a waveform with an optimized peak to average power (PAPR) in a communication network is provided. The method comprises performing a constellation rotation on input data symbols to create a rotated data symbols, wherein the input data symbols is obtained by performing at least one of prefixing a modulation data with first predefined number (N1) of zero's and post-fixing the modulation data with second predefined number (N2) of zero's. Also, the method comprises performing convolution operation on the input data symbols using one or more filter coefficients to produce a symbol level filtered data. The convolution module performs one of circular convolution and linear convolution. Further, the method comprises pulse shaping the symbol level filtered data using a pulse shaping filter to generate a pulse shaped data sequence and processing the pulse shaped data sequence to generate a waveform. The pulse shaping of the symbol level filtered data comprises transforming the symbol level filtered data into frequency domain using M-point Discrete Fourier Transform (DFT) to generate a DFT data sequence, spreading the DFT data sequence to generate spread DFT data sequence of a predefined length N, frequency domain filtering the spread DFT data sequence to generate filtered data sequence, mapping the filtered data sequence using one or more subcarriers to create a mapped data sequence and performing an inverse discrete Fourier transform (IDFT) on the mapped data sequence to generate a pulse shaped data sequence. The processing of the pulse shaped data sequence comprises performing at least one of transmit block selection, addition of cyclic prefix, addition of cyclic suffix, windowing, windowing with overlap and add operation, and frequency shifting on the pulse shape data sequence, to generate the waveform.

Another aspect of the present disclosure is a transmitter to generate and transmit a waveform in a communication network, having an optimized peak to average power ratio (PAPR). The transmitter comprises a constellation rotation module, convolution module, a pulse shaping module and a processing module. The constellation rotation module rotates input data symbols and generate rotated data symbols, wherein the input data symbols is obtained by performing at least one of prefixing a modulation data with first predefined number (N1) of zero's and post-fixing the modulation data with second predefined number (N2) of zero's. The convolution module convolves the input data symbols using one or more filter coefficients and produce a symbol level filtered data. The convolution module performs one of circular convolution and linear convolution. The pulse shaping module shapes the symbol level filtered data using a pulse shaping filter to generate a pulse shaped data sequence. The processing module process the pulse shaped data sequence and generate a waveform.

The pulse shaping module comprises a discrete Fourier transform (DFT) module to convert the symbol level filtered data into frequency domain using M-point DFT to generate a DFT data sequence, a spreading module to spread the DFT data sequence to generate a spread DFT data sequence of a predefined length N, a frequency domain filter to filter the spread DFT data sequence to generate filtered data sequence, a mapping module to perform mapping of the filtered data sequence using one or more subcarriers to create a mapped data sequence and an inverse discrete Fourier transform (IDFT) to convert the mapped data sequence in to time domain and generate a waveform. The processing of the pulse shaped data sequence comprises performing at least one of transmit block selection, addition of cyclic prefix, addition of cyclic suffix, windowing, windowing with overlap and add operation, and frequency shifting on the pulse shape data sequence, to generate the waveform.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 3A:
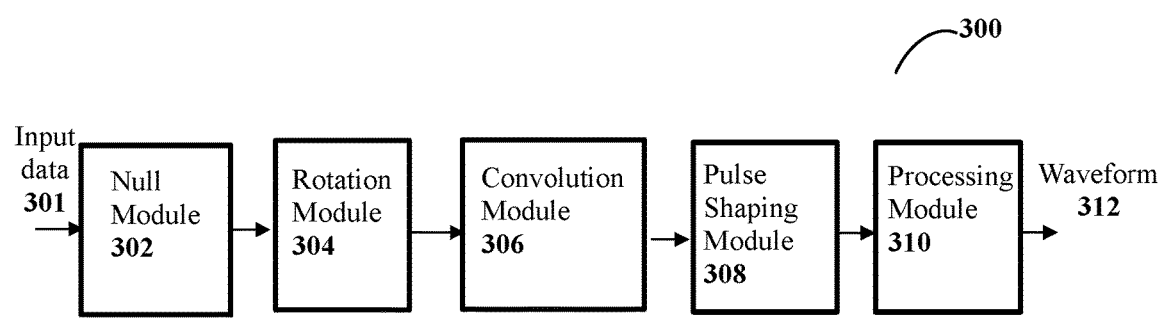
FIG. 3A illustrates a block diagram of an exemplary transmitter to generate and transmit a waveform, with low peak to average power ratio (PAPR), in a communication network, in accordance with some embodiments of the present disclosure.
Figure 3B:
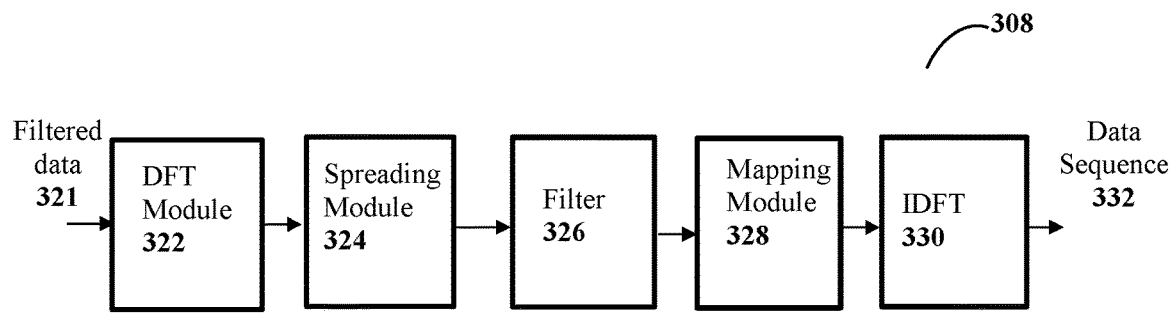
FIG. 3B illustrates an exemplary block diagram of a pulse shaping module in accordance with an embodiment of the present disclosure.
Figure 3C:
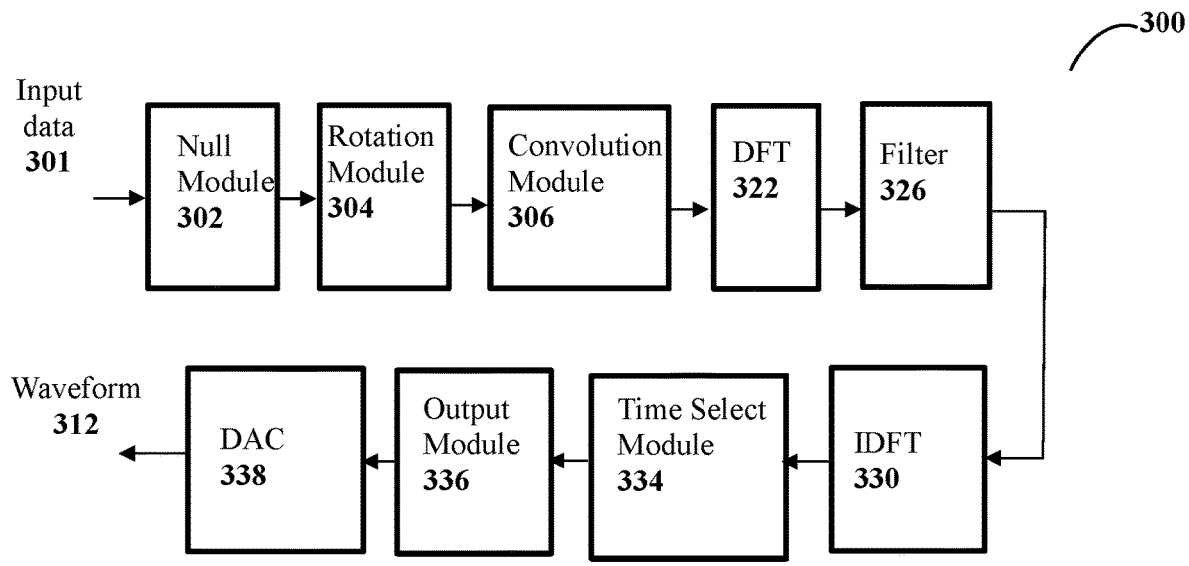
FIG. 3C illustrates a block diagram of an exemplary transmitter with a time select module to generate and transmit a waveform, with low peak to average power ratio (PAPR), in a communication network, in accordance with some embodiment of the present disclosure.
Figure 3D:
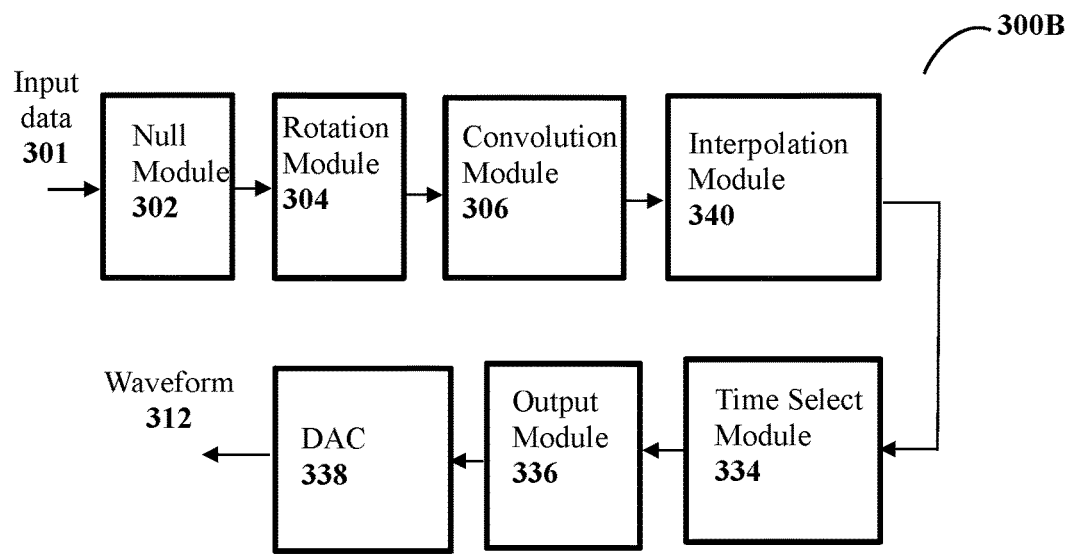
Figure 4:
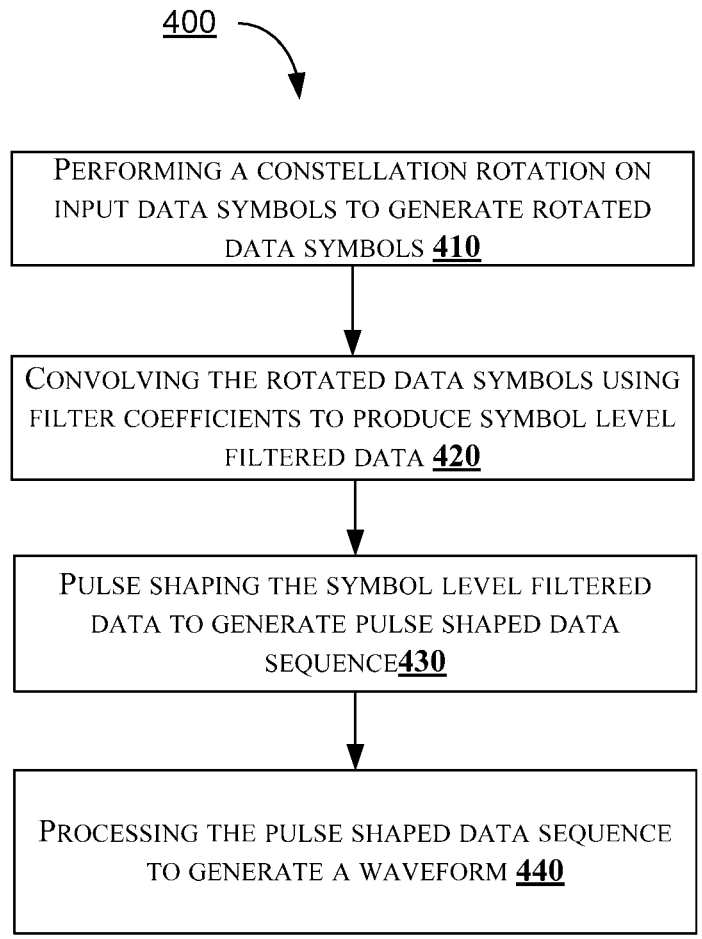

FIG. 3D illustrates a block diagram of an exemplary transmitter to generate and transmit a waveform, with low peak to average power ratio (PAPR), in a communication network, in accordance with an alternate embodiment of the present disclosure; and FIG. 4 shows a flowchart illustrating a method of generating a waveform in a communication network in accordance with some embodiments of the present disclosure;

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In an aspect of the present disclosure, a transmitter to generate and transmit a waveform in a communication network, having an optimized peak to average power ratio (PAPR) is provided. The transmitter comprises a constellation rotation module, convolution module, a pulse shaping module and a processing module. The constellation rotation module rotates input data symbols and generate rotated data symbols, wherein the input data symbols is obtained by performing at least one of prefixing a modulation data with first predefined number (N1) of zero's and post-fixing the modulation data with second predefined number (N2) of zero's. The convolution module convolves the input data symbols using one or more filter coefficients and produce a symbol level filtered data. The convolution module performs one of circular convolution and linear convolution. The pulse shaping module shapes the symbol level filtered data using a pulse shaping filter to generate a pulse shaped data sequence. The processing module process the pulse shaped data sequence and generate a waveform.

The pulse shaping module comprises a discrete Fourier transform (DFT) module to convert the symbol level filtered data into frequency domain using M-point DFT to generate a DFT data sequence, a spreading module to spread the DFT data sequence to generate a spread DFT data sequence of a predefined length N, a frequency domain filter to filter the spread DFT data sequence to generate filtered data sequence, a mapping module to perform mapping of the filtered data sequence using one or more subcarriers to create a mapped data sequence and an inverse discrete Fourier transform (IDFT) to convert the mapped data sequence in to time domain and generate a waveform.

Another aspect of the present disclosure is a method of generating a waveform in a communication network. The method comprises performing a constellation rotation on input data symbols to create a rotated data symbols, wherein the input data symbols is obtained by performing at least one of prefixing a modulation data with first predefined number (N1) of zero's and post-fixing the modulation data with second predefined number (N2) of zero's. Also, the method comprises performing convolution operation on the input data symbols using one or more filter coefficients to produce a symbol level filtered data. Further, the method comprises pulse shaping the symbol level filtered data using a pulse shaping filter to generate a pulse shaped data sequence and processing the pulse shaped data sequence to generate a waveform.

The pulse shaping of the symbol level filtered data comprises transforming the symbol level filtered data into frequency domain using M-point Discrete Fourier Transform (DFT) to generate a DFT data sequence, spreading the DFT data sequence to generate spread DFT data sequence of a predefined length N, frequency domain filtering the spread DFT data sequence to generate filtered data sequence, mapping the filtered data sequence using one or more subcarriers to create a mapped data sequence and performing an inverse discrete Fourier transform (IDFT) on the mapped data sequence to generate a pulse shaped data sequence. The processing of the pulse shaped data sequence comprises performing at least one of transmit block selection, addition of cyclic prefix, addition of cyclic suffix, windowing, windowing with overlap and add operation, and frequency shifting on the pulse shape data sequence, to generate the waveform.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
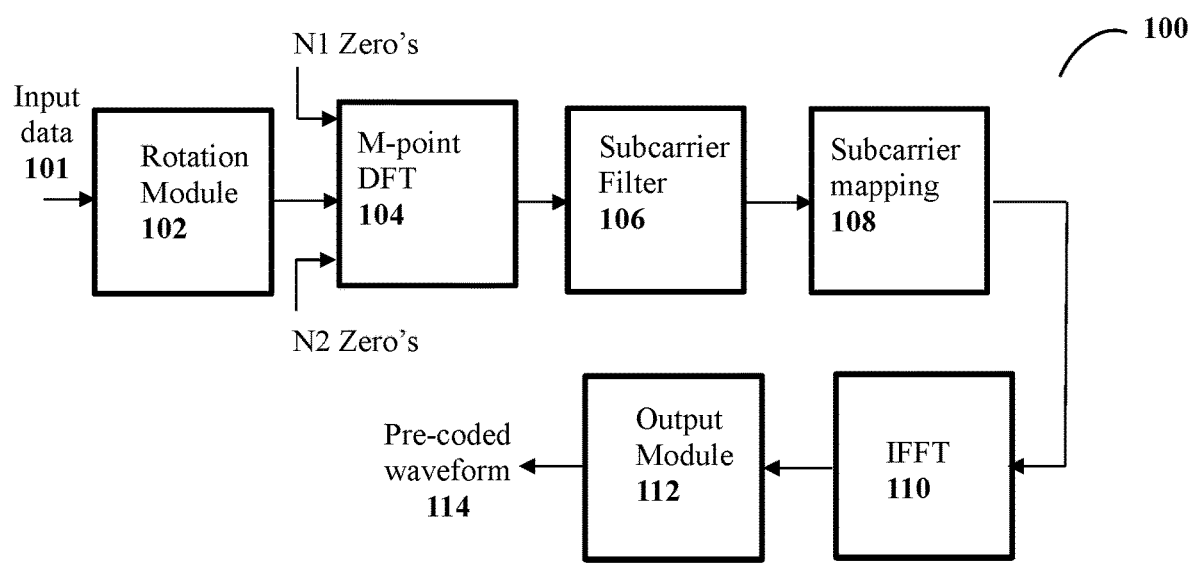
FIG. 1 illustrates a block diagram of a transmitter to generate and transmit a waveform in a communication network, in accordance with some embodiments of the present disclosure.

FIG. 1 illustrates a block diagram of transmitter to generate a waveform and transmit in a communication network. The transmitter is also referred as a generalized precoded (Orthogonal Frequency Division Multiple Access) OFDMA (GPO) transmitter or GPO transmitter to generate a waveform with low peak-to-average-power-ration (PAPR) and transmit in a communication network, in accordance with some embodiments of the present disclosure As shown in FIG. 1, the transmitter 100 comprises a rotation module 102, a Discrete Fourier Transform (DFT) module 104, at least one subcarrier filter 106, at least one subcarrier mapping module 108, inverse DFT module 110 and an output module 112. The transmitter is also referred as Generalized Precoded OFDM (GPO) transmitter, which achieves a low peak-to average-power-ratio (PAPR). The rotation module 102 performs constellation rotation on input data 101 or also referred as input symbols, to produce a rotated data symbols. The constellation rotation operation performed rotates the input data symbols by 180/Q degrees between consecutive data symbols, where Q is size of modulation alphabet. The input data sequence is one of a Binary Phase Shift Keying (BPSK) sequence, Q-ary amplitude shift keying (QASK), Quadrature Phase Shift Keying (QPSK) sequence and quadrature amplitude modulation (QAM). In one embodiment, the inputs data is binary phase-shift keying (BPSK), of predefined length and the phase difference between consecutive data symbols is 90-degrees. The input data comprises at least one of prefixed and post fixed predefined zeroes. The first predefined number (N1) of zero's is prefixed and a second predefined number (N2) of zero's are post-fixed. The presence of the zeroes reduces the signal discontinuities in the transmission of successive blocks of data and also reduce side lobes of transmit spectrum.

The DFT module 104 transforms the rotated data symbols into frequency domain using an M-point DFT (Discrete Fourier Transform) to create a DFT output data sequence also referred as transformed output data sequence, wherein M is length of data sequence. In an uplink, the DFT size is a user specific parameter. In an embodiment, the DFT size is predefined. The DFT module may further spread the DFT output by repeatedly concatenating the transformed output data sequence 's' times where 's' is an oversampling factor. The value of "s" may be greater than or equal to 1.

The subcarrier filter 106 and the subcarrier mapping module 108 perform the frequency domain pulse shaping or subcarrier level filtering on the output of DFT module, which is followed by mapping of frequency domain pulse shaped data to subcarriers. The mapping module 108 uses one of contiguous subcarrier mapping, interleaved subcarrier mapping, distributed subcarrier mapping. For the uplink operation, the frequency domain pulse shaping and mapping is a user specific operation. Different users may use different mapping rules. In some embodiments, the frequency domain pulse shaping and mapping rule are fixed operations. The user specific frequency shift or offset used by the subcarrier mapping operation determines whether users use is frequency orthogonal (non-overlapping subcarriers of users) or frequency non-orthogonal (partially or fully overlapping subcarriers among users).

The inverse DFT module 110 also referred as inverse fast Fourier transform (IFFT) performs the inverse transform of the frequency domain pulse shaped data with subcarrier mapping to generate a time domain signal. The output module 112 performs at least one of addition of cyclic prefix, cyclic suffix, windowing, windowing with overlap and adding operation, and frequency shifting on the time domain signal to generate output sequence. Next the output sequence is fed to the digital to analog converter to generate analog baseband precoded waveform 114.

In one embodiment, the transmitter uses the last Ncp samples of the time domain sequence and appends it to the beginning of the time domain data sequence to obtain CP (cyclic prefix) time domain sequence. The value of Ncp is a design parameter and may exceed the CP value specified by the standard specification. In another embodiment, a multiplicative windowing operation is performed on the CP time domain sequence to obtain windowed CP time domain sequence. The window function may be chosen such that the window takes zero value during the beginning of the CP time domain sequence and raises to unit value during the portion of the CP.

The window further starts decaying at some point towards the end of the CP time domain sequence and decays to zero at the edge of the CP time domain sequence. The window function is preferably chosen to be symmetric function. The said portion may take value less than or equal to the used CP length Ncp.

In one embodiment, the transmitter may employ both CP and cyclic post fix (CS). CS refers to addition of first Ncs samples of the time domain sequence and appends it to the beginning of the time domain data sequence to obtain CP and CS time domain sequence. The value of Ncs is a design parameter and may exceed the CP value specified by the specification.

In one embodiment windowing may be applied to the CP and CS time domain sequence. In this embodiment, the window may be chosen such that the window takes zero value during the beginning of the CP and rises to unit value during the CP portion. The window further starts decaying at some point during the CS portion of the CP and CS time domain sequence and decays to zero at the tail end the CS. The window function is preferably chosen to be symmetric function around the midpoint.

In another embodiment, the specification allows for CP of certain length only (CS is not allowed by the standard). However, the system appends an extended CP together with extended CS and further applies a window for the extended CP and CS signal. Same operation is performed consecutive OFDM symbols. Then multiple overlapping OFDM symbols are added and transmitted. This operation is known as windowing with overlap and adding operation. Note that windowing, overlap and add operation offers the benefits of reducing the discontinuities at the OFDM symbol boundaries and therefore offers lower out-of-band emission (OBE). However, overlap-add introduces interference between consecutive OFDM symbols that gives rise to some bit error rate (BER) penalty. The value of extended CP and CS and window function can be chosen to optimize the OBE and BER trade-off.

In another embodiment, further time domain filtering of multiple OFDM symbols may be performed on the signal that employs windowing and overlap add operation to reduce the OBE.

In another embodiment the time domain filtering is applied without applying windowing and overlap/add operation.

In one embodiment, the tails of the modulation date sequence that are fed to the DFT module are set to zero value to allow for the waveform to smoothly decay to zero value at the OFDM symbol boundaries. The number of zero tails used at the beginning of the modulation sequence may differ from the number of zero tails used at the end of the modulation sequence.

In one embodiment, zero tails are used without CP and/or CS. However, time domain filtering may be used. In another embodiment, zero tails are used with CP and/or CS together with windowing, overlap/add operation. However, time domain filtering may be used optionally.

In one embodiment, let the waveform be for a single user case. The transmitter 100 transmits a block of M−(N1+N2) i.i.d real/complex valued modulation alphabets with zero-mean awl variance $\sigma^2$. Let $a_r(l)$ denote the modulation data. The data is padded with N1 zeroes at the beginning and N2 zeroes at the end, wherein N1 and N2 or less than or equal to zero. In one embodiment the values of N1 and N2 are set to zero. Presence of these zeroes reduces the signal discontinuities in the transmission of successive blocks of data and the zeroes may reduce the side lobes of transmit spectrum.

In one embodiment, as shown in FIG. 1 a constellation specific phase rotation θ (l) is applied to obtain: $x_r(l)=e^{j\Theta(l)} a_r(l)$. The DFT precoding of the data stream $x_r(l)$ is accomplished using a M-point DFT as $$x(k) = \sum_{l=0}^{M-1} x_t(l) e^{\frac{-j2\pi lk}{M}} \quad k = 0, \ldots, M-1 \tag{1}$$

where l, k denote the discrete time and subcarrier indices, respectively, and x(M+k)=x(k). Alternative to (1), a two sided DFT can be taken as.

$$x(k) = \sum_{l=\frac{-M}{2}}^{\frac{M}{2}-1} e^{j\theta_t(l)} x_{i,t}(l) e^{\frac{-j2\pi lk}{M}} \quad \frac{-M}{2} \le k \le \frac{M}{2} - 1.$$

In an example embodiment, let a L fold periodic extension of x(k) wherein $$\tilde{x}(m) = x\left(\left(\left(m + \frac{LM}{2}\right) \bmod M\right) + 1\right).$$

Here, the elements of the vector $\tilde{x}(m)$ take the range $$m = -\frac{LM}{2}, \ldots, \frac{LM}{2} - 1$$

and ML=N, N being total number of used subcarriers. In time domain, $$\tilde{x}_t(n) = x_t\left(\frac{n}{L}\right)$$

for n=pL where p=0, 1, . . . , M−1 and $\tilde{x}_t(n)=0$ elsewhere and $$n = -\frac{N}{2}, \ldots, \frac{N}{2} - 1.$$

Here $$x_t(l) = \tilde{x}_t\left(lL - \frac{N}{2}\right)$$

for l=0, . . . , M−1. Let $$\tilde{x}(m) = \sum_{n=\frac{-N}{2}}^{\frac{N}{2}} \tilde{x}_t(m) e^{\frac{-2\pi mn}{N}} \quad m = \frac{-N}{2}, \ldots, \frac{N}{2} - 1 \tag{2}$$

$$= \sum_{l=0}^{M-1} x_t(l) e^{\frac{-j2\pi\left(lL - \frac{N}{2}\right)m}{N}} \tag{3}$$

$$= e^{j\pi m} \sum_{l=0}^{M-1} x_t(l) e^{\frac{-j2\pi lLm}{N}}. \tag{4}$$

Note that the DFT operation in (1) can also be implemented as a two sided DFT with l in the range $$\left[\frac{-M}{2}, \ldots, \frac{M}{2} - 1\right].$$

Alternatively, swap the left and right halves of x (k) with zero frequency component in the middle. Now consider a frequency domain pulse shaping filter $$q(m) = \sum_{n=-\frac{N}{2}}^{\frac{N}{2}-1} q_t(n) e^{\frac{-j2\pi nm}{N}}, m = -\frac{N}{2}, \ldots, \frac{N}{2} - 1 \tag{5}$$

wherein $q_t(n)$ are the samples of the time domain pulse shaping filter, q(m) may take zero values for certain subcarriers. Alternatively, all N subcarriers need not be modulated with data. In some cases, some subcarriers at band edges may be nulled out. Applying the pulse shape to the transmitted data $\tilde{x}(m)$, we have: $x_q(m)=q(m)\tilde{x}(m)$. The time domain baseband signal s(t) is obtained using an inverse discrete time Fourier transform (IDFT).

$$s(t) = \frac{1}{N} \sum_{m=-\frac{N}{2}}^{\frac{N}{2}-1} q(m)\tilde{x}(m) e^{j2\pi m\Delta f(t-T_{CP})}, \quad t \in [0, T + bT_{CP}] \tag{6}$$

wherein T is the useful portion of OFDMA symbol, $T_{CP}$ is the duration of the cyclic prefix (CP) and $$\Delta f = \frac{1}{T}$$

is the subcarrier spacing. Note that b=1 when the system uses CP only and b=2 when the system uses cyclic prefix as well as cyclic suffix. Using (4) and (5), the analog signal can be rewritten as $$s(t) = \frac{1}{N} \sum_{m=-\frac{N}{2}}^{\frac{N}{2}-1} e^{j\pi m} q(m)\tilde{x}(m) e^{j2\pi m\Delta f(t-T_{CP})}, \tag{7}$$

$$t \in [0, T + bT_{CP}]$$

$$= \frac{1}{N} \sum_{l=0}^{M-1} x_t(l) \sum_{m=\frac{-LM}{2}}^{\frac{LM}{2}-1} q(m) e^{j2\pi m \left(\frac{1}{T}(t-T_{CP})-\frac{lL}{N}+\frac{1}{2}\right)} \quad (8)$$

$$= \frac{1}{N} \sum_{l=0}^{M-1} e^{j\theta(l)} a_t(l) q_p\left(t - T_{CP} - \frac{lT}{M} + \frac{T}{2}\right) \quad (9)$$

where $$q_P(t) = \sum_{m=-\frac{N}{2}}^{\frac{N}{2}-1} q(m) e^{j2\pi m \frac{t}{T}}$$

and $T+bT_{CP}$ is the time domain pulse shaping function and $x_t(l)=e^{j\theta(l)}a_t(l)$. Let $q_p(t)=q_p(t+rT)$, $r$ being an integer. The transmitter sends successive data blocks serially where each data block is limited to duration of $T+bT_{CP}$ seconds. Here, the time domain signal has a form similar to conventional SC-FDMA with q(t) being the pulse shaping function.

In one embodiment, let there be a multiple access scenario wherein a number of users share the available bandwidth simultaneously. Let there be non-orthogonal and orthogonal user allocations where the users may employ distinct pulse shapes with different bandwidth requirements. Assuming there are a total of u users, let us denote the data of the $i^{th}$ user with $x_i(k)$ where $$x_i(k) = \sum_{l=0}^{M_i-1} e^{j\theta_i(l)} x_{i,t}(l) e^{\frac{-j2\pi lk}{M_i}}, k=0, \ldots, M_i-1 \quad (10)$$

wherein $M_i$ is the data length of the $i^{th}$ user, $\theta_i(l)$ being the constellation rotation employed by the $i^{th}$ user data $x_{i,t}$. Note that each user may employ a certain number of zero's at the tails. The number of zero's applied by all the users may be equal or unequal. Also, the DFT operation of equation (10) may be implemented using a two sided DFT as $$x_i(k) = \sum_{l=-\frac{M_i}{2}}^{\frac{M_i}{2}-1} e^{j\theta_i(l)} x_{i,t}(l) e^{\frac{-j2\pi lk}{M_i}}$$

$$\frac{-M_i}{2} \leq k \leq \frac{M_i}{2} - 1$$

Let $\tilde{x}_i(m)$ denote the Li fold periodic extension of $x_i(k)$ where $L_iM_i=N$ and let $q_i(l)$ be the FDPSF associated with this user that is defined as $$q_i(m) = \sum_{n=-\frac{N}{2}}^{\frac{N}{2}-1} q_{i,t}(n) e^{\frac{-j2\pi mn}{N}}, \quad (11)$$

for $m = -\frac{\overline{M}_i}{2}, \ldots, \frac{\overline{M}_i}{2} - 1$ $= 0$ elsewhere $\quad (12)$ where $q_{i,t}(n)$ are the corresponding time domain samples. In one embodiment, the FDPSF takes non-zero values over $\overline{M}_i$ subcarriers where $\overline{M}_i - M_i$ is the excess number of subcarriers employed for the $i^{th}$ user. In this case, $(\overline{M}_i - M_i)\Delta f$ is denoted as the excess bandwidth employed by the $i^{th}$ user. Further, the users are frequency multiplexed over the given the band of interest as $$s_i(t) = \frac{1}{N} \sum_{m=-\frac{N}{2}}^{\frac{N}{2}-1} q_i(m-m_i) \tilde{x}_i(m) e^{j2\pi \Delta f(t-T_{CP})}, \quad (13)$$

$t \in [0, T + bT_{CP}]$ where mi is the frequency shift of the $i^{th}$ user. This method results in a non-orthogonal multicarrier signal if the values of $m_i$ are set to integer multiples of $M_i$.

In an embodiment, let $$m_i = (i-1)M_i - \frac{N - \overline{M}_i}{2}$$

for $i=1, 2, \ldots, u_i$. The values of mi are chosen based on the subcarrier mapping procedure employed by the system, in another embodiment.

The transmitted signal is represented in an alternative form as below:

$$s_i(t) = \frac{1}{N} \sum_{l=0}^{M_i-1} e^{j\theta_i(l)} a_{i,t}(l) q_{i,p}\left(t - T_{CP} - \frac{lT}{M_i} + \frac{T}{2}\right), \quad (14)$$

$t \in [0, T + bT_{CP}]$ wherein, $$q_{i,p}(t) = \sum_{m=-\frac{N}{2}}^{\frac{N}{2}-1} q_i(m-m_i) e^{j2\pi m \frac{t}{T}}$$

is the time domain pulse shaping function is used by the $i^{th}$ user. Here, $q_{i,p}(t)=q_{i,p}(t+rT)$, where r is an integer.

Let $$q_{i,p}(t) = \sum_{m=-\frac{N}{2}}^{\frac{N}{2}-1} q_i(m-m_i) e^{j2\pi m \frac{t}{T}} \quad (15)$$

$t \in [0, T + bT_{CP}]$

Using (11) and substituting $m-m_i=m_i$ in (15) we express $q_i(t)$ in alternative form as $$q_{i,p}(t) = e^{j2\pi m_i \frac{t}{T}} \sum_{m=-\frac{\overline{M}_i}{2}}^{\frac{\overline{M}_i}{2}-1} q_i(m) e^{j2\pi m \frac{t}{T}} \quad (16)$$

-continued $$= q_{0,i}(t)e^{-j2\pi n_i \frac{t}{T}} \quad (17)$$
$$t \in [0, T + bT_{CP}]$$

is the baseband pulse shaping function used by the $i^{th}$ user. The transmitted signal may be written as $$s_i(t) = \frac{1}{N}\sum_{l=0}^{M_i-1} e^{j\theta_i(l)} a_{i,t}(l) q_{0,i}\left(t - T_{CP} - \frac{lT}{M_i} + \frac{T}{2}\right) e^{j2\pi m_i \frac{\left(t-T_{CP}-\frac{lT}{M_i}+\frac{T}{2}\right)}{T}} \quad (18)$$

In an embodiment, let total number of subcarriers be N. However, only Nu subcarriers out of N may be used by the transmitter or system. The remaining (N-Nu) subcarriers do not carry the data. Furthermore, a number of users are frequency multiplexed over the Nu subcarriers. The transmitted signal is given by $$s_i(t) = \frac{1}{Nu} \sum_m q_i(m - m_i)\tilde{x}_i(m) e^{j2\pi\Delta f(t - T_{cp})}$$
$$t \in [0, T + bT_{CP}]$$

The transmitted signal spans over a group of subcarriers whose range is dictated by the subcarriers occupied by the signal of the $i^{th}$ user. Also, the value of mi is a system design feature that may be used to control the amount of non-orthogonality introduced by the system. The value of mi may be set to $M_i$, $\overline{M}_i$ or any other value. For example, setting the value of mi in the range $[0\ M_1]$ increases the spectrum efficiency of the system. In another alternative example, let the value of mi be in the range $[M_i\ \overline{M}_i]$. In certain cases, one may set the value of mi to be zero, if multiple users or signals of multiple antennas are allowed to transmit on the same time frequency resource.

On embodiment of the present disclosure is symbol windowing. As the transmit signal from the transmitter, is confined to a period of one OFDM symbol duration, effectively it imposes a rectangular window function that leads to high OBE. Addition of zero's at the tails reduces the signal discontinuities at the block boundaries and leads to a reduction in side lobes. The options for reducing OBE is by performing at least one of addition of zero tails without CP, addition of zero tails with CP and no tails but CP only.

In cases where CP is used, in order to further reduce OBE we employ time domain window functions that offer smooth transitions at the OFDM symbol boundaries. Also, the method of pre-coding comprises a cyclic prefix as well as cyclic postfix each of duration $T_{CP}$. The analog signal is given as $$s_i(t) = \frac{1}{N} \sum_{m=-\frac{N}{2}}^{\frac{N}{2}-1} w(t) q_i(m-m_i)\tilde{x}_i(m) e^{j2\pi m \Delta f(T-T_{CP})}, \quad (19)$$
$$t \in [0, T + bT_{CP}]$$

$$= \frac{1}{N}\sum_{l=0}^{M_i-1} e^{j\theta_i(l)} a_{i,t}(l) w(t) q_{i,p}\left(t - T_{CP} - \frac{lT}{M_i} + \frac{T}{2}\right), \quad (20)$$
$$t \in [0, T + bT_{CP}]$$

wherein w(t) is the window function defined over the interval t∈[0, T+bT$_{CP}$], i.e. designed as the OFDM symbol block duration. The window w(t) is chosen such that it takes a constant value for the duration of the OFDM symbol that excludes cyclic prefix and suffix. The window takes a constant value during a portion of the cyclic prefix and/or suffix and it tapers to a zero value at the block boundaries. Standard time domain window functions such as, but not limited to, square root raised cosine (SQRC), RC, Hamming, Hanning, Bartltt window may be used.

In one embodiment, the standard such as 3GPP specification specifies CP only. However, the transmitter uses an extended CP followed by an extended CS. Windowing is applied on each OFDM symbol with CP and CS followed by addition of successive OFDM symbols that results in overlapping OFDM symbols during a portion of time. This type of windowing having overlap and add operation reduces the discontinuities at the OFDM symbol boundaries and also reduces the OBE.

To avoid a dc subcarrier, the transmitted signal $s_i(t)$ is further multiplied with $e^{j\pi a\Delta f(t-T_{CP})}$ or $e^{-j\pi a\Delta f(t-T_{CP})}$ wherein 'a' is a real-valued number. In one embodiment the value of 'a' is 1. In one embodiment, a signal that is generated for multiple users over distinct or distributed frequency resources is transmitted from the transmitter or same user equipment. In this case, the low PAPR properties of the signal does not hold any more but the user will be able to transmit at a higher data rate using multiple distributed time-frequency resources. The modulation data symbols transmitted by a user equipment is usually encoded by an error correction code such as block code, convolutional code, or a turbo code, followed by a scrambler, interleaver before mapped to the desired modulation format.

One embodiment of the present disclosure is about precoding a waveform that generates low PAPR waveform. The PAPR may be controlled using a predefined constellation rotation factor θ(l), modulation size Q and the FDPSF q(m) given in (5). In an embodiment, let $$\theta(l) = \frac{\pi(l-1)}{2}$$

for real constellations, and for Q-ary complex constellations such as, but not limited to, QAM, let $$\theta(l) = \frac{\pi(l-1)}{Q}.$$

For the special case of Q=2, waveforms with nearly constant envelope by selecting $$\theta(l) = \frac{\pi(l-1)}{2},$$

and by choosing the FDPSF based on the linearized Gaussian pulse that is obtained as the principal pulse in the PAM decomposition of a binary CPM signal with modulation index 0.5. The time domain samples of the FDPSF $q_t(n)$ may be selected as:

$$q_t(n) = p_0(t)\big|_{t=\tau_0+\frac{nT}{s}}$$

wherein $p_0(t)$ is the linearized Gaussian pulse (principal pulse in the Laurants' decomposition of GMSK), s is the over-sampling factor, and the factor BT controls the characteristics of the waveform, and $\tau_o$ is constant time offset, and n is an integer. Since the pulse is time limited, the values of n can be taken in the range $$\frac{-sM}{2} \leq n \leq \frac{sM}{2} - 1.$$

With an over-sampling rate of s, the Fourier transform of $q_t(n)$ is periodic with a period $$\frac{s}{T}.$$

The FDPSF with a span of sM subcarriers is obtained by taking a sM point DFT of $q_t(n)$ as defined in (11). Alternatively, the FDPSF can be obtained by taking an sM point DFT first as $$\tilde{q}(m) = \sum_{n=0}^{sM-1} q_t(n) e^{\frac{-j2\pi n m}{sM}}$$

$$0 \leq m \leq sM - 1$$

The left and right halves of the DFT output can be swapped so that the zero frequency components in the middle. Alternatively, the FDPSG can be obtained using a two sided DFT as $$q(m) = \sum_{n=\frac{-sM}{2}}^{\frac{sM}{2}-1} q_t(n) e^{\frac{-j2\pi n m}{sM}}$$

$$\frac{-sM}{2} \leq m \leq \frac{sM}{2} - 1$$

Since the sequence $q_t(n)$ is real-valued, in certain cases, it can be appropriately circularly shifted by certain amount before taking the DFT to make the DFT output real. Also, a FDPSF of length less than sM may be applied by truncating the FDPSF filter at both ends.

In an alternate embodiment, let a $M_0$ point DFT of $q_t(n)$ where $M_0 > sM$ and $$q_t(n) = p_0(t)|_{t=\frac{nT}{s}}$$

for $$n = -\frac{M_0}{2}, \ldots, \frac{M_0}{2} - 1$$

is considered then collect sM points out of $M_0$ points by decimating the DFT output to generate q(m). In yet another alternative implementation, the values of q(m) can be obtained by taking samples of $p_0(f)$ (that is the Fourier transform of $p_0(t)$ taken at appropriate intervals).

For the special case of s=1, we can design PDPSF without excess BW. In this case, the waveform introduces ISI but has zero multi-user interference. To obtain the time domain samples for s=1, we can first generate the samples corresponding to s=2, then choose either the even or odd symbol spaced sample sequence to generate the required FDPSF.

Some examples of values of time domain samples of the $q_t(n)$ is given in Tables 1 and 2 where the pulse response is forced to be causal i.e., the values of $q_t(n)$ is positive for $n \geq 0$ and takes a zero value for n<0. In the Table the values of $q_t(n)$ start with n=0. Then, $$\tilde{q}(m) = \sum_{n=0}^{sM-1} q_t(n) e^{\frac{-j2\pi n m}{sM}}$$

$$0 \leq m \leq sM - 1$$

The FDPSF q(m) is obtained after the left and right halves of the DFT output $\tilde{q}(m)$ is swapped so that the zero frequency components is atm=0. In an alternatively, considering the range $0 \leq n \leq sM-1$, the causal response $q_t(n)$ is circularly shifted to the left by certain amount so that the zeroth time sample is located at n=0 and negative time samples are located in the left half. In this case, the pulse response is real and symmetric i.e., $q_t(n) = q_t(sM-n)$. The DFT of this sequence is also real and symmetric i.e., $\tilde{q}(m) = \tilde{q}(sM-m)$. The FDPSF q(m) is obtained after the left and right halves of the DFT output $\tilde{q}(m)$ is swapped so that the zero frequency components in located atm=0, as shown in the below Tables 1 and 2:

TABLE 1

| MSK, s = 3 $\tau_0 = 0$ | MSK, s = 3 $\tau_0 = \frac{T}{2}$ | MSK, s = 2, $\tau_0 = 0$ | MSK, s = 1 $\tau_0 = \frac{T}{2}$ |
|---|---|---|---|
| 0.5 | 0.2588 | 0.7071 | 0.7071 |
| 0.866 | 0.7071 | 1 | 0.7071 |
| 1 | 0.9659 | 0.7071 | 0 |
| 0.866 | 0.9659 | 0 | 0 |
| 0.5 | 0.7071 | 0 | 0 |
| 0 | 0.2588 | 0 | 0 |
| 0 | 0 | 0 | 0 |

TABLE 2

| BT = 0.3, L = 6, s = 2 $\tau_0 = 0$ | BT = 0.3, L = 6, s = 1 $\tau_0 = \frac{T}{2}$ | BT = 0.3, L = 6, s = 1 $\tau_0 = 0$ | BT = 0.3, L = 6, s = 1 $\tau_0 = \frac{T}{2}$ |
|---|---|---|---|
| 0.0007 | 0.0315 | 0.0007 | 0.707 |
| 0.0315 | 0.7057 | 0.2605 | 0.7071 |
| 0.2605 | 0.7057 | 0.9268 | 0 |
| 0.7057 | 0.0315 | 0.2605 | 0 |
| 0.9268 | 0 | 0.0007 | 0 |
| 0.7057 | 0 | 0 | 0 |
| 0.2605 | 0 | 0 | 0 |
| 0.0315 | 0 | 0 | 0 |
| 0.0007 | 0 | 0 | 0 |

Figure 2:
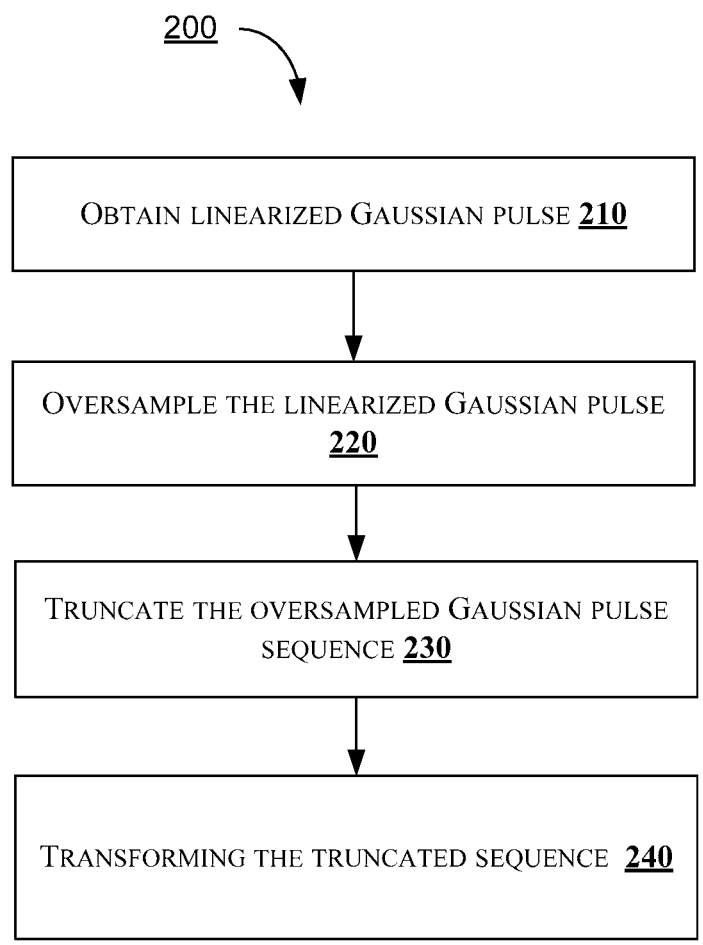
FIG. 2 shows a flowchart illustrating generation of oversampled linearized GMSK pulse coefficients or polynomial coefficients, in accordance with some embodiments of the present disclosure.

FIG. 2 shows a flowchart illustrating generation of over-sampled linearized GMSK pulse coefficients or polynomial coefficients, in accordance with some embodiments of the present disclosure The principal pulse $p_0(t)$ is the main pulse in Laurent's decomposition is given by $$p_0(t) = \begin{cases} \prod_{k=1}^{k=L_1} c(t-kT) & t \in [0, (L_1+1)T] \\ 0 & \text{otherwise} \end{cases}$$

where $$c(t) = \begin{cases} \cos\left(-\frac{\pi}{2}r(t)\right) & t \in [0, L_1 T] \\ c(-t) & t \in (-L_1 T, 0] \\ 0 & |t| \geq L_1 T \end{cases}$$

The pulse $q(t)$ is a Gaussian filtered rectangular pulse response defined as $$r(t) = \frac{1}{T}\left[Q\left(\gamma\left(\frac{t}{T}-\frac{1}{2}\right)\right) - Q\left(\gamma\left(\frac{t}{T}+\frac{1}{2}\right)\right)\right]$$

wherein $$\gamma \cong \frac{2\pi BT}{\sqrt{(\ln(2))}},$$

BT is a parameter that controls the pulse shape, and $$Q(x) \cong \frac{1}{\sqrt{2\pi}} \int_x^\infty e^{-\frac{u^2}{2}} du.$$

The value of L1 determines the pulse duration. The value of L1 is chosen to be in the range 4 to 6.

In one embodiment, the subcarrier filter may also be obtained by multiplying the sM point DFT coefficients of the oversampled linearized GMSK pulse with another frequency domain window to reduce the interference caused to other users. The frequency domain window may take constant value during the portion of the subcarriers and applies attenuation for the remaining subcarriers. An example of the frequency domain window is a square-root-raised-cosine function employing certain excess bandwidth.

In another embodiment other waveforms that are not derived from PAM (Pulse Amplitude Modulation) decomposition of CPM can also be used to obtain oversampled time domain pulses. In FIG. 2, the IDFT of any oversampled waveform can be used to circularly convolve oversampled data with oversampled pulse that is generated using the IDFT.

FIG. 3A illustrates a block diagram of an exemplary transmitter 300 to generate a waveform in a communication network, in accordance with an embodiment of the present disclosure. The generated waveform has an optimized peak to average power (PAPR). As shown in FIG. 3A, the pulse shaping is performed in frequency domain.

As shown in FIG. 3A, the transmitter 300 comprises at least one null module 302, at least one rotation module 304, at least one convolution module 306, at least one pulse shaping module 308 and a processing module 310. The transmitter is also referred as Generalized Precoded OFDM (GPO) transmitter, which achieves a low peak-to average-power-ratio (PAPR). The null module 302 performs at least one of prefixing a modulation data also referred as input data 301 with first predefined number (N1) of zero's and post-fixing the modulation data with second predefined number (N2) of zero's to produce one or more input data symbols. The presence of the zeroes reduces the signal discontinuities in the transmission of successive blocks of data and also reduce side lobes of transmit spectrum. The value of N1 is at least zero. The value of N2 is at least zero.

The rotation module 304 performs constellation rotation on the input data symbols or also referred as input bits, to generate rotated data symbols. In an embodiment, the constellation rotation operation performed by the rotation module 304 rotates the input data sequence by 90 degrees. In one embodiment, the constellation rotation module rotates the input data symbols to produce a phase difference of 180/Q degrees between successive input data symbols, where Q is cardinality of modulation symbols. The input data symbols is one of a Binary Phase Shift Keying (BPSK) sequence, Q-ary amplitude shift keying (QASK), Quadrature Phase Shift Keying (QPSK) sequence and quadrature amplitude modulation (QAM). In one embodiment, the inputs data is binary phase-shift keying (BPSK), of predefined length. The input data symbols are a pilot sequence, in one embodiment.

The convolution module 306 performs convolution on the input data symbols using one or more filter coefficients and produce a symbol level filtered data. The convolution operation may be one of circular convolution and linear convolution. In an embodiment, the following filter coefficents obtained using symbol rate sampling of linearized GMSK pulse may be used p=[0.0315 0.7057 0.7057 0.0315] or
p=[0.7057 0.7057 0 0] or
p=[0.2605 0.9268 0.2605 0] or
p=[0.9268 0.2605 0 0.2605]

Scaling of the filter coefficients to unit power can be done. For example, scaling the 3-tap filter to unit power gives and rounding the coefficients to the second decimal value gives p=[0.28 1 0.28]

The pulse shaping module 308 shapes the symbol level filtered data using a pulse shaping filter to generate a pulse shaped data sequence.

FIG. 3B illustrates an exemplary block diagram of a pulse shaping module 308 in accordance with an embodiment of the present disclosure. The pulse shaping module comprises a discrete Fourier transform (DFT) module 322, a spreading module 324, a filter 326, a mapping module 328 and an inverse discrete Fourier transform (IDFT) module 330.

As shown in FIG. 3B, the DFT module 322 converts the symbol level filtered data 321, from time domain into frequency domain, using a M-point DFT to generate a DFT data sequence, wherein M is a length of the input data symbols. The DFT module 322 is a fast Fourier transform (FFT), in one embodiment. The spreading module 324 spreads the DFT data sequence to generate a spread DFT data sequence of a predefined length N, wherein N is greater than or equal to M. The filter 326 is a frequency domain filter in one embodiment. In one embodiment, the frequency domain filter is a square-root-raised cosine filter employing certain excess BW. In another embodiment, the frequency domain filter is rectangular filter.

The frequency domain filter is a product of a pair of filters, in one embodiment. The filter 326 filters the spread DFT data sequence to produce filtered data sequence. The mapping module 328 performs the mapping operation of the filtered data sequence using one or more subcarriers to create a mapped data sequence. The mapping module 328 uses one of contiguous subcarrier mapping, interleaved subcarrier mapping, distributed subcarrier mapping. For the uplink operation, the frequency domain pulse shaping and mapping is a user specific operation. Different users may use different mapping rules. In some embodiments, the frequency domain pulse shaping and mapping rule are fixed operations. The user specific frequency shift or offset used by the subcarrier mapping operation determines whether users use is frequency orthogonal (non-overlapping subcarriers of users) or frequency non-orthogonal (partially or fully overlapping subcarriers among users). In one embodiment, the mapping the filtered data sequence using one or more subcarriers depends on a plurality of users specific frequency shift used by the subcarrier mapping, wherein the plurality of users specific frequency shift is at least one of frequency orthogonal, frequency non-orthogonal and fully frequency overlapping. The IDFT module 330 converts the mapped data sequence in to a time domain signal to generate a data sequence 332. The IDFT module 330 is an inverse fast Fourier transform (IFFT), in one embodiment.

Referring back to FIG. 3A, the processing module 310 processes the pulse shaped data sequence using at least one of transmit block selection, addition of cyclic prefix, addition of cyclic suffix, windowing, windowing with overlap and add operation, and frequency shifting on the pulse shape data sequence, to generate the waveform 312. The transmit block selection performs at least one of selection of a portion of the pulse shape data sequence and entire pulse shape data sequence. In an embodiment, the combination of nulls (zero padding), linear convolution using 306, and transmit block selection that selects a portion of the pulse shape data sequence (that avoids the null symbols) can be used to generate a precoded version of conventional single carrier signal. In another embodiment, the combination of nulls (zero-padding), circular convolution using 306, and transmit block selection that selects entire pulse shape data sequence can be used to generate a precoded signal. A digital to analog converter (DAC) coverts the output sequence in to analog to generate analog baseband precoded waveform. The generated waveform is transmitted by the transmitter 300 in the communication network.

FIG. 3C illustrates a block diagram of an exemplary transmitter with a time select module to generate and transmit a waveform in a communication network, in accordance with some embodiment of the present disclosure. The generated waveform has an optimized peak to average power (PAPR). The FIG. 3C shows a complete block diagram of the transmitter and the generated waveform is having a low peak to average power ratio (PAPR). As shown in FIG. 3C, the transmitter 300 comprises a null module 302, a rotation module 304 and a convolution module 306 of FIG. 3A. Also, the transmitter comprises a pulse shaping module comprising a DFT module 322, a filter 326, a mapping module 328 and an IDFT module 330, as shown in FIG. 3B. Further, the transmitter comprises a time select module 334, for selecting the mapped data sequence that is the output of the IDFT 330.

The transmitter also comprises an output module 336. The output module 336 performs at least one of addition of cyclic prefix, addition of cyclic suffix, windowing, windowing with overlap and addition operation, and frequency shifting on the pulse shape data sequence, to generate the waveform.

A digital to analog converter (DAC) 338 coverts the output sequence, from the output module 336, from digital signal into an analog signal and to generate analog baseband precoded waveform. The generated waveform is transmitted by the transmitter 300 in the communication network.

FIG. 3D illustrates a block diagram of an exemplary transmitter to generate a waveform to be transmitted in a communication network, in accordance with an alternate embodiment of the present disclosure.

As shown in FIG. 3D, the transmitter 300B comprises a null module 302, a rotation module 304 and a convolution module 306 of FIG. 3A. Also, the transmitter comprises a pulse shaping module comprises an interpolation module 340 to perform the pulse shaping of the symbol level filtered data, from the convolution module. The pulse shaping is performed in time domain. Thereafter, the interpolation module or interpolation filter 340 inserts a predefined number of zero's between each successive symbol level filtered data samples to generate oversampled symbol level filtered data samples. The interpolation filter 340 performs convolution of oversampled symbol level filtered data samples and a oversampled time domain filter sequence to obtain pulse shaped data sequence that is processed using time select module 334. The oversampled time domain filter sequence is one of oversample linearized Gaussian pulse, square root raised cosine pulse and sync pulse. In an embodiment, the combination of nulls (zero padding), linear convolution using 306, linear convolution using the interpolation module 340 and time select module 334 that selects a portion of the pulse shape data sequence (that avoids the null symbols) may be used to generate a precoded version of conventional single carrier signal. In another embodiment, the combination of nulls (zero padding), circular convolution using 306, circular convolution using the interpolation module and time select module that selects a full pulse shape data sequence may be used to generate a precoded OFDM signal. A digital to analog converter (DAC) 338 coverts the output sequence, from the output module 336, from digital signal into an analog signal and to generate analog baseband precoded waveform. The generated waveform is transmitted by the transmitter 300 in the communication network.

The generated output is fed in to the processing module or output module 336, which performs at least one of addition of cyclic prefix, cyclic suffix, windowing, overlap and add operation, and frequency shifting on the time domain signal to generate output sequence before the signal is fed to the digital to analog converter (DAC) 338. In an embodiment, the frequency shifting operation may be subsumed as part of the user pulse shaping filter.

FIG. 4 shows a flowchart illustrating a method of generating a waveform in a communication network in accordance with some embodiments of the present disclosure.

As illustrated in FIG. 4, the method 400 comprises one or more blocks for generating a waveform in a communication network. The order in which the method 400 is described is not intended to be construed as a limitation, and any number of the described method blocks can be combined in any order to implement the method. Additionally, individual blocks may be deleted from the methods without departing from the spirit and scope of the subject matter described herein.

At block 410, a rotation module, configured in the transmitter, performs a constellation rotation on an input data symbols to generate a rotated data symbols. The input data symbols is obtained by performing at least one of prefixing a modulation data with first predefined number (N1) of zero's and post-fixing the modulation data with second predefined number (N2) of zero's. The input data symbols is one of a Binary Phase Shift Keying (BPSK) sequence, Q-ary amplitude shift keying (QASK), Quadrature Phase Shift Keying (QPSK) sequence and quadrature amplitude modulation (QAM). In one embodiment, the inputs data is binary phase-shift keying (BPSK), of predefined length. The input data symbols is a pilot sequence, in one embodiment.

The constellation rotation performed on the input data symbols is by 90-degrees. The constellation rotation operation on the input data symbols produces a phase difference of 180/Q degrees between successive input data symbols, where Q is cardinality of modulation symbols. The input data symbols are prefixed or post fixed by a predefined zeroes N1 and N2, respectively. The presence of the zeroes reduces the signal discontinuities in the transmission of successive blocks of data and also reduce side lobes of transmit spectrum.

At block 420, a convolution operation is performed, by a convolution module configured in the transmitter, on the input data symbols using one or more filter coefficients to produce a symbol level filtered data.

At block 430, pulse shaping of the symbol level filtered data is performed by the pulse shaping module, configured in the transmitter, using a pulse shaping filter to generate a pulse shaped data sequence. The symbol level filtered data is converted from time domain into frequency domain, using a M-point DFT or FFT to generate a DFT data sequence. The DFT data sequence is spread to generate a spread DFT data sequence by a predefined length N, wherein N is greater than or equal to M. The spread DFT data sequence is filtered to produce filtered data sequence. The filtered data sequence is mapped using one or more subcarriers to create a mapped data sequence, which is converted in to a time domain waveform.

At block 440, processing the pulse shaped data sequence by a processing module, configured in the transmitter, to generate a waveform. The processing of the pulse shaped data sequence is using at least one of transmit block selection, addition of cyclic prefix, addition of cyclic suffix, windowing, windowing with overlap and add operation, and frequency shifting on the pulse shape data sequence, to generate the waveform. The transmit block selection performs at least one of selection a portion of the pulse shape data sequence and entire pulse shape data sequence. A digital to analog converter (DAC) coverts the output sequence in to analog to generate analog baseband precoded waveform. The generated waveform is transmitted by the transmitter 300 in the communication network.

One embodiment of the present disclosure is a method to multiplex data of a user using an approximated continuous phase modulation (CPM) signal, which is implemented using a summation of multiple GPO signals. The approximated CPM signal is obtained by representing CPM a superposition of multiple PAM signals and GPO modulation is applied for each PAM component using: frequency domain pulse shaping corresponding to each component pulse, modulation for each specific pulse and a phase rotation factor for each component pulse. Only the dominant PAM components can be used for transmission. A CPM signal is represented as a sum of N-PAM signals as:

$$s(t) = \sum_k \sum_{i=0}^{N-1} a_{k,i} p_i(t - kT)$$

Where $a_{k,i}$ the pseudo-symbols are related to the input data to CPM modulator, and $p_i(t)$ are the component pulses. In certain cases, the signal is dominated by a few dominant components. Examples include, but not limited to, GMSK, SOQPSK and its variants (SOQPSK-TG), FOQPSK etc. In some embodiments, input data to the CPM is typically precoded using certain precoder. A CPM approximation of the GPO may be obtained by summing multiple GPO signals where each GPO is driven by the pseudo symbols and the frequency domain pulse shaping filters obtaining by taking the DFT of the oversampled pulses $p_i(t)$. The summation is carried out over the dominant components of the PAM approximation. A trellis based receiver may be used at the receiver.

One embodiment of generating a waveform in the communication network, by the transmitter 300 may be used for transmission of pilot or reference signals. The transmitter 300 transmits a pilot or reference signal using a reference or pilot sequence that is given as input to the transmitter 300. Any of the transmitter embodiments may be used for pilot transmission. A user or transmitter may use different pilot/references sequences with low cross-correlation. The pilot/reference signal may be time multiplexed with data in different OFDM symbols. Alternative pilot/reference signal transmission methods include transmission of LTE type reference signals such as Zadoff-Chu (ZC) sequences mapped on to different pilot/reference subcarriers or DFT-precoded ZC sequences mapped to different pilot/reference subcarriers.

In one embodiment, a GPO receiver performs at least one operation such as, but not limited to, estimation of channel impulse response, which is performed in two ways. In first method, estimation of propagation channel response is performed using ZC type pilots/reference signals. The estimated propagation channel is multiplied with known frequency domain subcarrier filter coefficients in frequency domain to obtain total impulse response in frequency domain. The second method is to estimate total channel response directly using pilots or reference signals employing GPO.

In one embodiment, for BPSK transmission the receiver comprises a constellation de-rotation operation in time/frequency domain and filtering the received signals and received signals complex-conjugate in time/frequency domain. Equalization methods such as, but not limited to, linear equalizer, decision feedback equalizer (DFE), iterative block DFE, and sequence estimation methods may be used.

In another embodiment, the GPO transmitter may be used in conjunction with code division multiple access (CDMA).

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Transmitter |
| 101 | Input data |
| 102 | Rotation Module |
| 104 | Discrete Fourier Transform (DFT) module |
| 106 | Subcarrier Filter |
| 108 | Subcarrier Mapping Module |
| 110 | Inverse DFT Module |
| 112 | Output Module |
| 114 | Pre-coded Waveform |
| 300 | Transmitter |
| 301 | Input Data |
| 302 | Null Module |
| 304 | Rotation module |
| 306 | Convolution Module |
| 308 | Pulse Shaping Module |
| 310 | Processing Module |
| 312 | Waveform |
| 321 | Filtered Data |
| 322 | DFT Module |
| 324 | Spreading Module |
| 326 | Filter |
| 328 | Mapping Module |
| 330 | IDFT Module |
| 332 | Data Sequence |
| 334 | Time Select Module |
| 336 | Output Module |
| 338 | DAC |
| 300B | Transmitter |
| 340 | Interpolation Module |

The invention claimed is:

1. A method of generating a waveform in a communication network, the method comprising:
   performing a constellation rotation, by a transmitter, on input data symbols to create rotated data symbols, wherein the input data symbols are obtained by performing at least one of prefixing a modulation data with a first predefined number (N1) of zero's and post-fixing the modulation data with a second predefined number (N2) of zero's;
   pulse shaping, by the transmitter, the rotated data symbols using a pulse shaping filter to generate a pulse shaped data sequence, wherein the pulse shaping of the rotated data symbols comprises:
   transforming the rotated data symbols into frequency domain using M-point Discrete Fourier Transform (DFT) to generate a DFT data sequence, wherein M is a length of the rotated data symbols;

spreading the DFT data sequence to generate a spread DFT data sequence of a predefined length N, wherein N is greater than or equal to M;

frequency domain filtering the spread DFT data sequence to generate a filtered data sequence, wherein the frequency domain filtering is a product of a plurality of filters, and wherein a first filter of the plurality of filters is a DFT of samples of a linearized Gaussian pulse;

mapping the filtered data sequence using one or more subcarriers to create a mapped data sequence; and performing an inverse discrete Fourier transform (IDFT) on the mapped data sequence to generate a pulse shaped data sequence; and processing, by the transmitter, the pulse shaped data sequence to generate a waveform.

2. The method as claimed in claim 1, wherein the input data symbols are one of a Binary Phase Shift Keying (BPSK) sequence, Q-ary amplitude shift keying (QASK), Quadrature Phase Shift Keying (QPSK) sequence and quadrature amplitude modulation (QAM).

3. The method as claimed in claim 1, wherein the input data symbols are pilot sequences.

4. The method as claimed in claim 1, wherein value of the N1 is at least zero.

5. The method as claimed in claim 1, wherein value of the N2 is at least zero.

6. The method as claimed in claim 1, wherein the constellation rotation operation is performed to rotate the input data symbols by 90 degrees.

7. The method as claimed in claim 1, wherein the constellation rotation operation on the input data symbols produces a phase difference of 180 divided by Q (180/Q) degrees between successive input data symbols, where Q is cardinality of modulation symbols.

8. The method as claimed in claim 1, wherein the frequency domain filtering of the spread DFT data sequence is performed by one of a rectangular filter, square root raised to cosine filter and any other spreading filter.

9. The method as claimed in claim 1, wherein the frequency domain filtering of the spread DFT data sequence is performed using a DFT of truncated samples of a linearized Gaussian pulse.

10. The method as claimed in claim 9, wherein the DFT of truncated samples of linearized Gaussian pulse are obtained using sM point DFT, wherein s is a real valued parameter used for oversampling the linearized Gaussian pulse and a value of s is at least one.

11. The method as claimed in claim 1, wherein a second filter of the plurality of filters is a filter providing a constant value over a predefined portion of subcarriers and decays to zero value over the remaining portion of subcarriers.

12. The method as claimed in claim 1, wherein the mapping of the filtered data sequence using one or more subcarriers depends on a plurality of users specific frequency shifts used by the subcarrier mapping, wherein the plurality of users specific frequency shifts is at least one of frequency orthogonal, frequency non-orthogonal and fully frequency overlapping.

13. The method as claimed in claim 1, wherein the processing of the pulse shaped data sequence comprises performing at least one of transmit block selection, addition of cyclic prefix, addition of cyclic suffix, windowing, windowing with overlap and add operation, and frequency shifting on the pulse shape data sequence, to generate the waveform.

14. The method as claimed in claim 13, wherein the transmit block selection performs at least one of selection a portion of the pulse shape data sequence and entire pulse shape data sequence.

15. The method as claimed in claim 13 further comprising converting the waveform from digital form to an analog form.

16. The method as claimed in claim 1, wherein the pulse shaping of the symbol level filtered data comprises filtering the rotated data symbols further using a time domain filter to generate a time domain pulse shaped data sequence.

17. The method as claimed in claim 16, wherein the filtering comprising:

inserting a predefined number of zero's between each successive symbol level filtered data samples to generate oversampled symbol level filtered data samples; and performing convolution on the oversampled symbol level filtered data samples with an oversampled time domain filter sequence.

18. The method as claimed in claim 17, wherein the convolution is one of circular convolution and linear convolution.

19. The method as claimed in claim 17, wherein the oversampled time domain filter sequence is one of oversample linearized Gaussian pulse, square root raised cosine pulse and sync pulse.

20. A transmitter to generate and transmit a waveform in a communication network, the transmitter comprising:

a constellation rotation module configured to rotate input data symbols and generate rotated data symbols, wherein the input data symbols are obtained by performing at least one of prefixing a modulation data with a first predefined number (N1) of zero's and post-fixing the modulation data with a second predefined number (N2) of zero's;

a pulse shaping module configured to shape the rotated data symbols using a pulse shaping filter to generate a pulse shaped data sequence, wherein the pulse shaping module comprises:

a discrete Fourier transform (DFT) module to convert the rotated data symbols into frequency domain using M-point DFT to generate a DFT data sequence, wherein M is a length of the input data symbols;

a spreading module to spread the DFT data sequence to generate a spread DFT data sequence of a predefined length N, wherein N is greater than or equal to M;

a frequency domain filter to filter the spread DFT data sequence to generate a filtered data sequence, wherein the frequency domain filter is a product of a plurality of filters, and wherein a first filter of the plurality of filters is a DFT of samples of a linearized Gaussian pulse;

a mapping module to perform mapping of the filtered data sequence using one or more subcarriers to create a mapped data sequence; and an inverse discrete Fourier transform (IDFT) to convert the mapped data sequence to a pulse shaped data sequence in time domain; and a processing module configured to process the pulse shaped data sequence and generate a waveform.

21. The transmitter as claimed in claim 20, wherein the input data symbols are one of a Binary Phase Shift Keying (BPSK) sequence, Q-ary amplitude shift keying (QASK), Quadrature Phase Shift Keying (QPSK) sequence and quadrature amplitude modulation (QAM).

22. The transmitter as claimed in claim 20, wherein the input data symbols are pilot sequences.

23. The transmitter as claimed in claim 20, wherein value of the N1 is at least zero.

24. The transmitter as claimed in claim 20, wherein value of the N2 is at least zero.

25. The transmitter as claimed in claim 20, wherein the constellation rotation operation is performed to rotate the input data symbols by 90 degrees.

26. The transmitter as claimed in claim 20, wherein the constellation rotation module rotates the input data symbols to produce a phase difference of 180 divided by Q (180/Q) degrees between successive input data symbols, where Q is cardinality of modulation symbols.

27. The transmitter as claimed in claim 20, wherein the frequency domain filter performs filtering the spread DFT data sequence using one of a rectangular filter, square root raised to cosine filter and any other spreading filter.

28. The transmitter as claimed in claim 20, wherein the frequency domain filter performs filtering of the spread DFT data sequence using a DFT of truncated samples of a linearized Gaussian pulse.

29. The transmitter as claimed in claim 28, wherein the DFT of truncated samples of linearized Gaussian pulse are obtained using sM point DFT, wherein s is a real valued parameter used for oversampling the linearized Gaussian pulse and value of s is at least one.

30. The transmitter as claimed in claim 20, wherein a second filter of the plurality of filters is a filter providing a constant value over a predefined portion and decays to zero value over the remaining portion.

31. The transmitter as claimed in claim 20, wherein the mapping of the filtered data sequence using one or more subcarriers depends on a plurality of users specific frequency shifts used by the subcarrier mapping, wherein the plurality of users specific frequency shifts is at least one of frequency orthogonal, frequency non-orthogonal and fully frequency overlapping.

32. The transmitter as claimed in claim 20, wherein the processing module performs processing of the pulse shaped data sequence using at least one of transmit block selection, addition of cyclic prefix, addition of cyclic suffix, windowing, windowing with overlap and add operation, and frequency shifting on the pulse shape data sequence, to generate the waveform.

33. The transmitter as claimed in claim 32, wherein the transmit block selection performs at least one of selection of a portion of the pulse shape data sequence and an entire pulse shape data sequence.

34. The transmitter as claimed in claim 32 further comprising converting the waveform from digital form to an analog form.

35. The transmitter as claimed in claim 20, wherein the pulse shaping module filters of the rotated data symbols further use a time domain filter to generate a time domain pulse shaped data sequence.

36. The transmitter as claimed in claim 35, wherein the time domain filter comprising:
   an insert module to an insert a predefined number of zeros between each successive symbol level filtered data samples to generate oversampled symbol level filtered data samples; and
   a convolution module to perform convolution on the oversampled symbol level filtered data samples with an oversampled time domain filter sequence.

37. The transmitter as claimed in claim 36, wherein the convolution is one of circular convolution and linear convolution.

38. The transmitter as claimed in claim 36, wherein the oversampled time domain filter sequence is one of oversample linearized Gaussian pulse, square root raised cosine pulse and sync pulse.

* * * * *